(12) United States Patent
Meehan et al.

(10) Patent No.: US 9,440,246 B2
(45) Date of Patent: Sep. 13, 2016

(54) RATCHETING HOSE NUT FOR A FLUID DELIVERY DEVICE

(71) Applicant: Masco Corporation of Indiana, Indianapolis, IN (US)

(72) Inventors: Steven Kyle Meehan, Fishers, IN (US); Yilin Tang, Guangzhou (CN); Sishen Luo, Foshan (CN)

(73) Assignee: Delta Faucet Company, Indianapolis, IN (US)

( * ) Notice: Subject to any disclaimer, the term of this patent is extended or adjusted under 35 U.S.C. 154(b) by 683 days.

(21) Appl. No.: 13/709,968

(22) Filed: Dec. 10, 2012

(65) Prior Publication Data

US 2014/0159362 A1 Jun. 12, 2014

(51) Int. Cl.
 *B05B 1/00* (2006.01)
 *F16L 19/00* (2006.01)
 *E03C 1/04* (2006.01)

(52) U.S. Cl.
 CPC . *B05B 1/00* (2013.01); *E03C 1/04* (2013.01); *F16L 19/005* (2013.01); *E03C 2001/0415* (2013.01)

(58) Field of Classification Search
 CPC .......... F16D 7/04; B05B 1/00; F16L 19/005; E03C 2001/04153; E03C 1/04
 USPC .................. 285/92, 320, 305, 362; 439/321
 See application file for complete search history.

(56) References Cited

U.S. PATENT DOCUMENTS

| | | | |
|---|---|---|---|
| 3,980,325 A | 9/1976 | Robertson | |
| 4,133,565 A | 1/1979 | Shutt | |
| 4,577,894 A | 3/1986 | Wake | |
| 4,946,200 A | 8/1990 | Blenkush et al. | |
| 5,188,398 A | 2/1993 | Parimore, Jr. et al. | |
| 5,200,575 A * | 4/1993 | Sheehan | 174/654 |
| 5,498,043 A | 3/1996 | Goldenberg | |
| 5,590,228 A * | 12/1996 | Gibola | G02B 6/389 385/56 |
| 5,653,605 A * | 8/1997 | Woehl et al. | 439/321 |
| 6,015,171 A * | 1/2000 | Schorn | 285/362 |
| 6,279,961 B1 | 8/2001 | Stoltz | |
| 6,293,595 B1 | 9/2001 | Marc et al. | |
| 6,557,900 B1 * | 5/2003 | Austin | 285/92 |
| 6,796,462 B2 | 9/2004 | Hudson et al. | |
| 7,410,193 B2 | 8/2008 | Guest | |
| 7,909,061 B2 | 3/2011 | Nelson | |
| 8,152,078 B2 | 4/2012 | Jianglin et al. | |
| 8,181,997 B2 | 5/2012 | Wang | |
| 8,256,463 B2 * | 9/2012 | Farag | E03C 1/04 137/801 |
| 2007/0267869 A1 * | 11/2007 | Patel | F16L 19/005 285/386 |
| 2011/0169258 A1 * | 7/2011 | Nowak | F16L 19/025 285/18 |
| 2012/0267456 A1 * | 10/2012 | Imagawa | B05B 15/065 239/569 |

* cited by examiner

*Primary Examiner* — Daniel P Stodola
*Assistant Examiner* — Zachary Dragicevich
(74) *Attorney, Agent, or Firm* — Faegre Baker Daniels LLP (57) ABSTRACT

A hose nut for coupling a fluid delivery device to a fluid conduit is provided. In one embodiment, the hose nut includes a pawl configured to rotate about a hinge between a locked position and an unlocked position. The hose nut is configured to rotate in a first tightening direction relative to the fluid delivery device and a second loosening direction opposite the first tightening direction when the pawl is in the unlocked position, and the pawl is configured to radially engage the fluid delivery device to move the pawl to the unlocked position during rotation in the first tightening direction and the pawl is configured to engage the fluid delivery device to resist rotating in the second loosening direction when the pawl is in the locked position.

14 Claims, 10 Drawing Sheets

RATCHETING HOSE NUT FOR A FLUID DELIVERY DEVICE

BACKGROUND AND SUMMARY OF THE INVENTION

The present disclosure relates generally to an apparatus and method for coupling a fluid conduit to a fluid delivery device. More particularly, the present disclosure relates to an apparatus and method for establishing a fluid coupling resistant to undesired rotation between a fluid conduit and a fluid delivery device.

Faucets having spray devices, including pullout wands, pulldown wands, side sprayers, and sprayheads releasably coupled to faucet spouts, are generally known. Exemplary spray devices are disclosed in U.S. Pat. No. 7,909,061, issued Mar. 22, 2011 and entitled "Magnetic Coupling for Sprayheads," and U.S. Pat. No. 8,152,078, issued Apr. 10, 2012 and entitled "Faucet Spray Head," the disclosures of which are hereby incorporated by reference. Sprayheads allow a user to remove the sprayhead from a stored position coupled to a faucet spout and direct a flow of water to a desired location. Such conventional sprayheads each include a fluid conduit, such as a hose or fluid tube, that extends through the faucet spout and is supported for movement therein for allowing the user to position the sprayhead in a desired location. The hose or fluid conduit is typically configured to retract back through the faucet spout when the wand is returned to a stored position.

In some embodiments, the sprayhead is fluidly coupled to the fluid conduit with a threaded coupler or nut. Over time, the repeated use of the sprayhead may cause the threaded coupler to loosen. A loosened coupler may eventually cause a leak at the fluid coupling between the sprayhead and the fluid conduit.

According to an illustrative embodiment of the present disclosure, a fluid coupling for a fluid delivery device is provided. In one illustrative embodiment, the fluid coupling includes a sidewall extending along a longitudinal axis and supporting threads, and a pawl coupled to the sidewall by a hinge, the pawl configured to pivot about the hinge between a locked position and an unlocked position. The sidewall is rotatable about the longitudinal axis in a first tightening direction relative to the fluid delivery device and a second loosening direction relative to the fluid delivery device opposite the first tightening direction when the pawl is in the unlocked position.

According to another illustrative embodiment of the present disclosure, a fluid coupling for a fluid delivery device is provided. In one illustrative embodiment, the fluid coupling includes a waterway having a connector having a plurality of teeth around a circumference of the connector defining a plurality of circumferential gaps between the plurality of teeth, and a hose nut coupled to a fluid conduit. The hose nut includes a pawl configured to rotate about a hinge between a locked position and an unlocked position. The hose nut is configured to rotate in a first tightening direction relative to the waterway and a second loosening direction opposite the first tightening direction when the pawl is in the unlocked position. When the hose nut is in the locked position, the pawl is configured to radially engage at least one of the plurality of teeth during rotation in the first tightening direction, the radial engagement rotating the pawl about the hinge towards the unlocked position, and the pawl is configured to circumferentially engage at least one of the plurality of teeth during rotation in the second loosening direction, the circumferential engagement resisting rotation in the second loosening direction.

According to still another illustrative embodiment of the present disclosure, a method of coupling a fluid source to a fluid delivery device is provided. The method includes the steps of coupling a delivery end of the fluid conduit to a hose nut, the hose nut comprising an first threaded surface, a pawl adjustable about a hinge between a locked and an unlocked position, and coupling the hose nut to the fluid delivery device having a second threaded surface, a waterway, and a plurality of teeth supported by the waterway defining a plurality of circumferential gaps between the plurality of teeth. The coupling step includes engaging the first threaded surface and the second threaded surface while rotating the fluid delivery device in a first tightening direction relative to the hose nut. The method further includes the steps of radially engaging the pawl with at least one of the plurality of teeth, wherein the radial engagement moves the pawl from the locked position to the unlocked position, returning the pawl to the locked position, and applying a force to move the pawl from the locked position to the unlocked position and rotating the fluid delivery device relative to the hose nut in a second loosening direction opposite the first tightening direction while the pawl is in the unlocked position. When the hose nut is in the locked position, the pawl is configured to radially engage at least one of the plurality of teeth during rotation in the first tightening direction, the radial engagement rotating the pawl about the hinge towards the unlocked position, and the pawl is configured to circumferentially engage at least one of the plurality of teeth during rotation in the second loosening direction, the circumferential engagement resisting rotation in the second loosening direction.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Corresponding reference characters indicate corresponding parts throughout the several views. Although illustratively used to fluidly couple a sprayhead and fluid conduit, a ratcheting hose nut according to the present disclosure may also be used to couple other fluid delivery devices, including a pair selected from pulldown wands, shower heads, faucet spray heads, hoses, fluid conduits, pullout wands, fluid tubes, hand showers, side sprayers, and faucet spouts.

Figure 1:
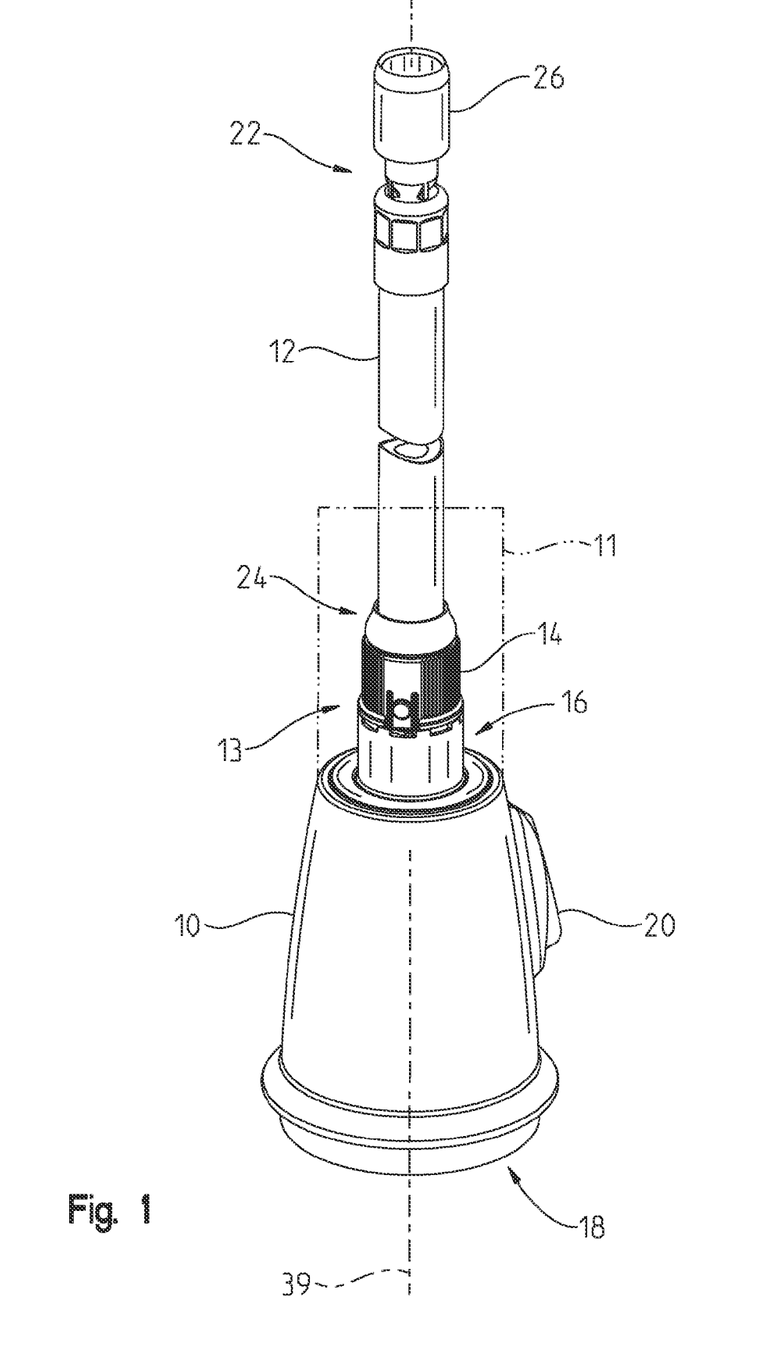
FIG. 1 is a perspective view of a fluid coupling between a sprayhead and a fluid conduit according to the present disclosure, with a faucet spout shown in phantom.

As shown in FIG. 1, a pulldown wand or sprayhead 10 is removably fluidly coupled at least partially within an outlet of a faucet spout 11 (illustrated in phantom) to a hose or fluid conduit 12 through a fluid coupling 13 including ratcheting hose nut 14. Sprayhead 10 includes an inlet end 16 and an outlet end 18. Sprayhead 10 illustratively includes toggle button 20 for adjusting the flow of water exiting outlet end 18 of sprayhead 10. For example, the toggle button 20 may be operably coupled to a diverter (not shown) for changing water flow exiting the outlet end 18 between a spray mode and a stream mode.

Fluid conduit 12 includes an inlet or receiving end 22 and an outlet or delivery end 24. Receiving end 22 may include conventional coupling 26 (such as an internally threaded sleeve) configured to be fluidly to a pipe, tube, or other water source to deliver water to sprayhead 10. Delivery end 24 is illustratively fluidly coupled to inlet end 16 of sprayhead 10.

Figure 2:
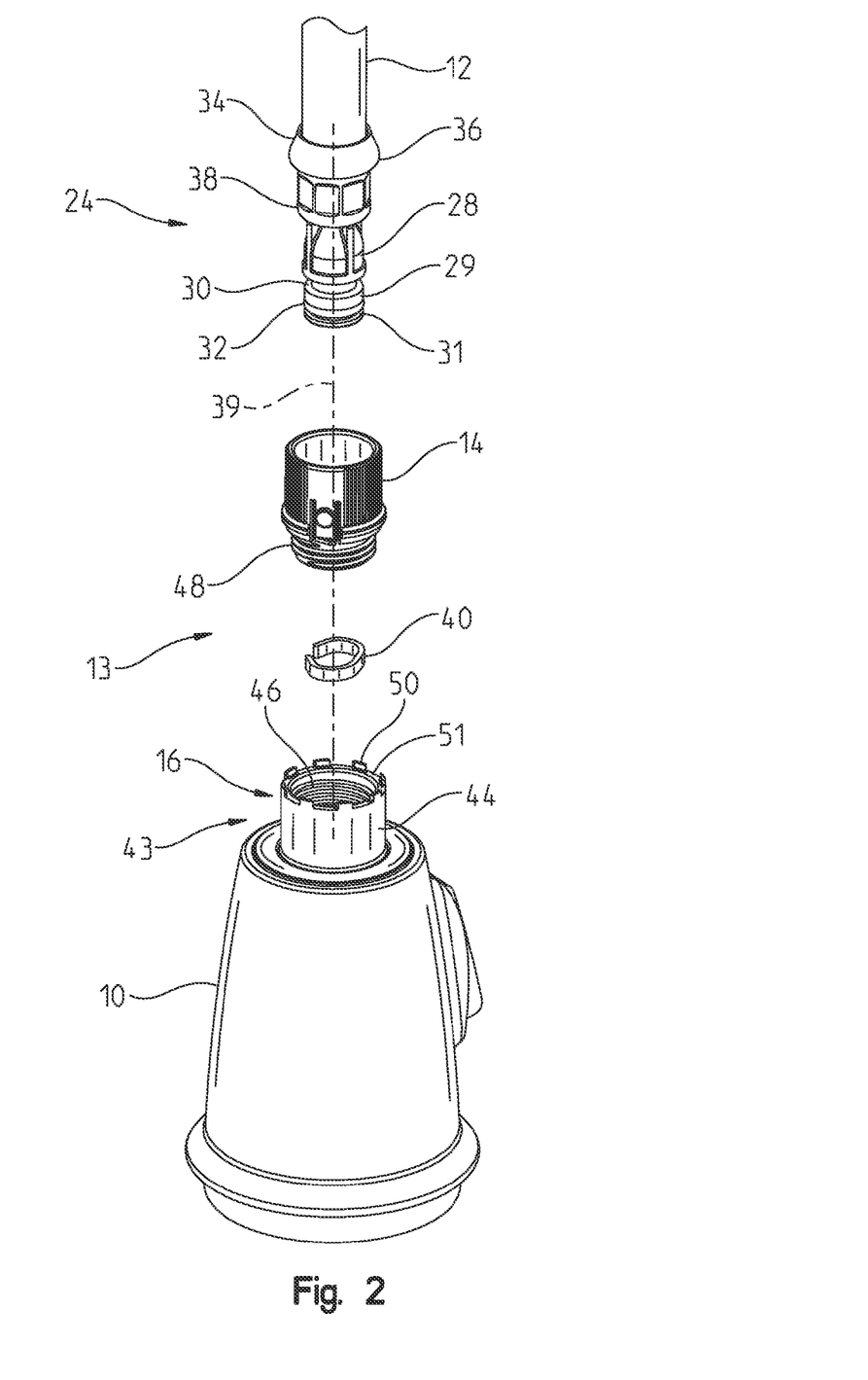
FIG. 2 is an exploded perspective view of the fluid coupling between the sprayhead and fluid conduit of FIG. 1.

Referring next to FIG. 2, an exploded perspective view of the fluid coupling 13 between the pulldown assembly and fluid conduit 12 of FIG. 1 is shown. Fluid conduit 12 includes delivery connector 28 extending from delivery end 24. Delivery connector 28 includes a body 29 having a circumferential groove 30 around at least a portion thereof. Illustratively, delivery connector 28 includes a seal 32 positioned in a second groove 31. Fluid conduit 12 further includes sleeve 34 covering a portion of delivery end 24 and delivery connector 28. Sleeve 34 is illustratively crimped to fluid conduit 12 and includes a first flared end 36 and a second flared end 38 about which ratcheting hose nut 14 can rotate. As further detailed herein, hose nut 14 is coupled to fluid conduit 12 and supported for rotation about longitudinal axis 39.

As shown in FIG. 2, a clip 40, illustratively a substantially C-shaped member, is configured to be received within circumferential groove 30 in body 29. When received within circumferential groove 30, clip 40 has an outer diameter greater than that of body 29. Illustratively, clip 40 is constructed of a resilient material, such as plastic or other elastomeric material, allowing the ends of C-shaped clip 40 to move apart from each other, forming an open position, and move towards each other, forming a closed position. In the illustrative embodiment of FIG. 2, the arms of C-shaped clip 40 do not touch in the closed position, but the arms may touch in other exemplary embodiments. The arms of C-shaped clip 40 are illustratively biased towards the open position.

Figure 7:
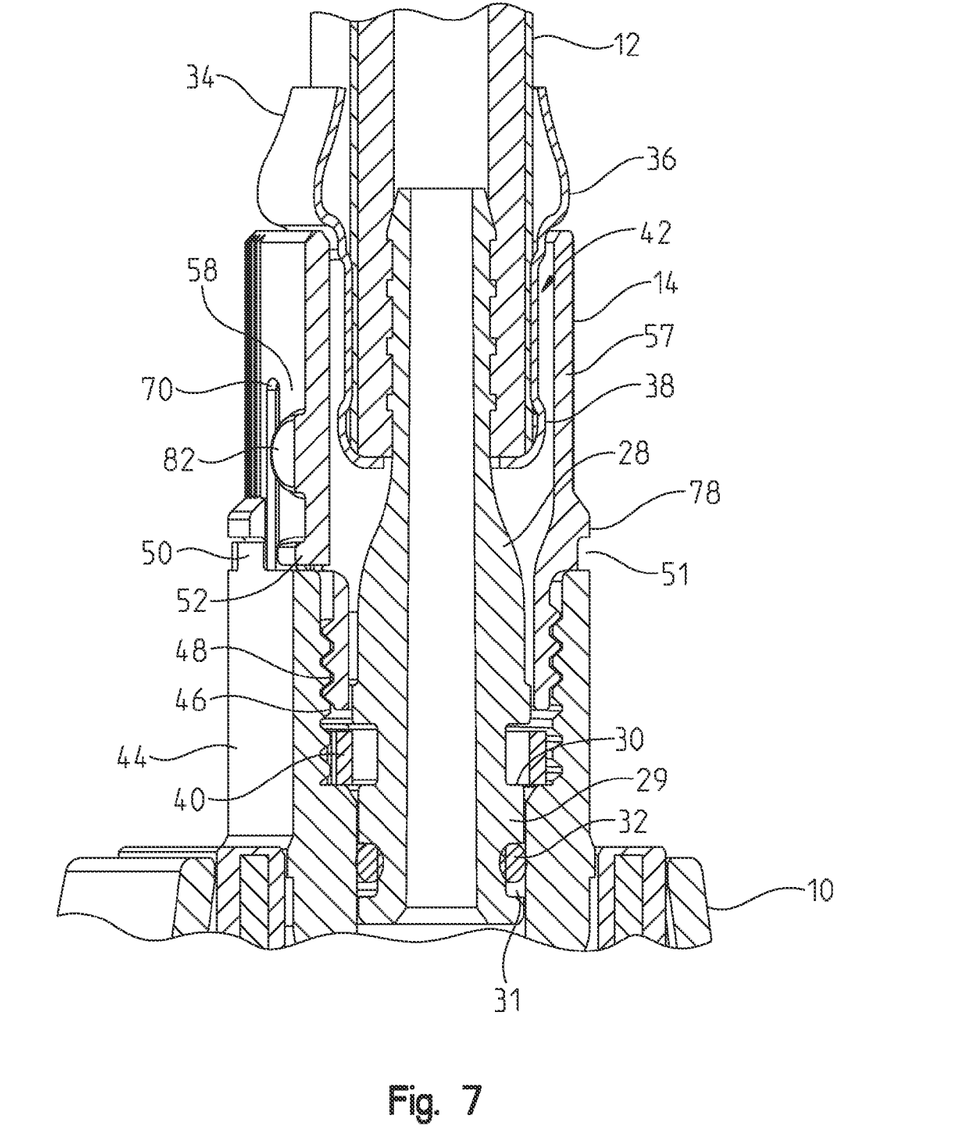
FIG. 7 is a perspective cross-sectional view generally along line 7-7 of FIG. 3, showing the fluid coupling between the sprayhead and the fluid conduit.
Figure 8A:
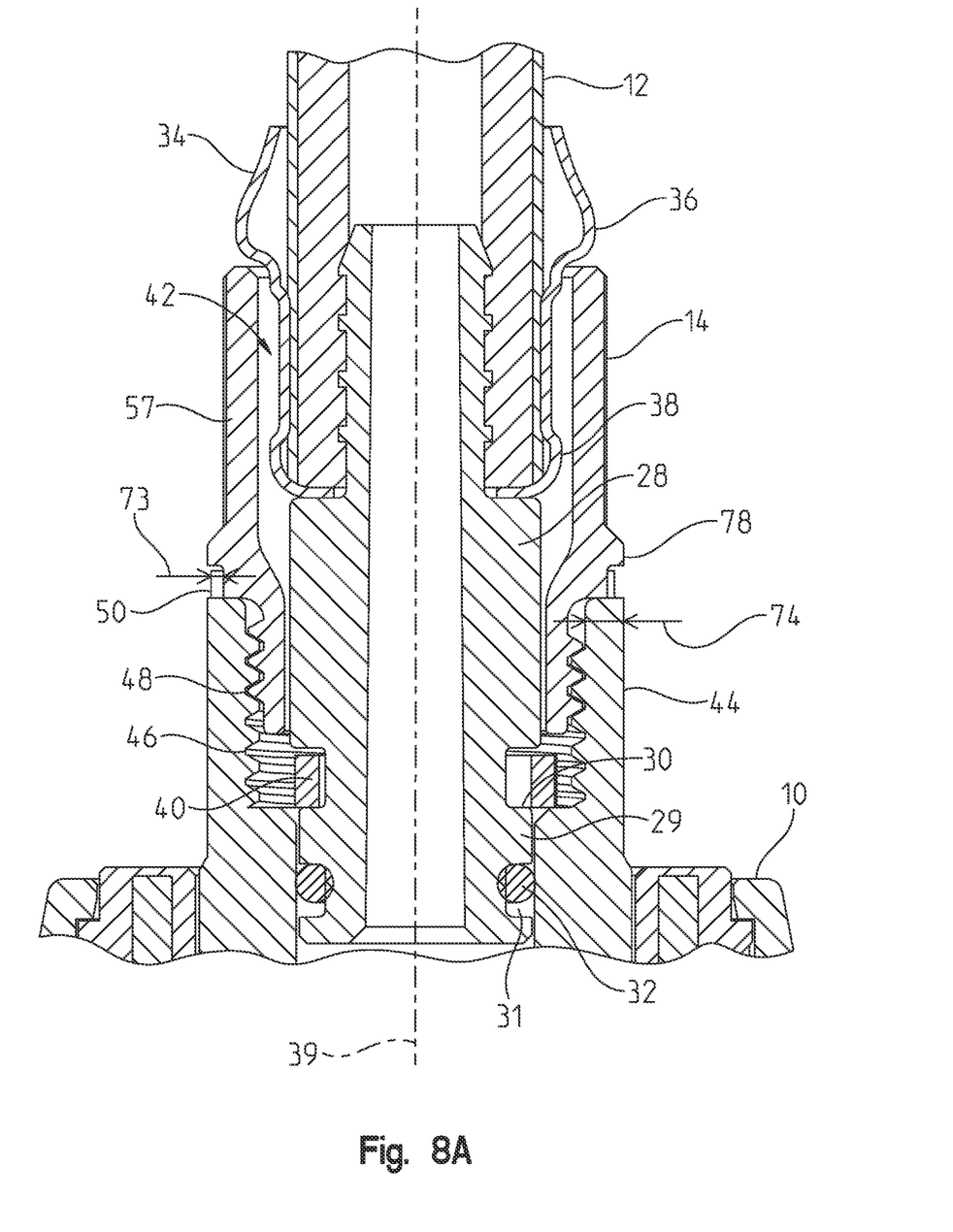
FIG. 8A is a cross-sectional view taken along line 8-8 of FIG. 3, showing the fluid coupling between the sprayhead and the fluid conduit.
Figure 8B:
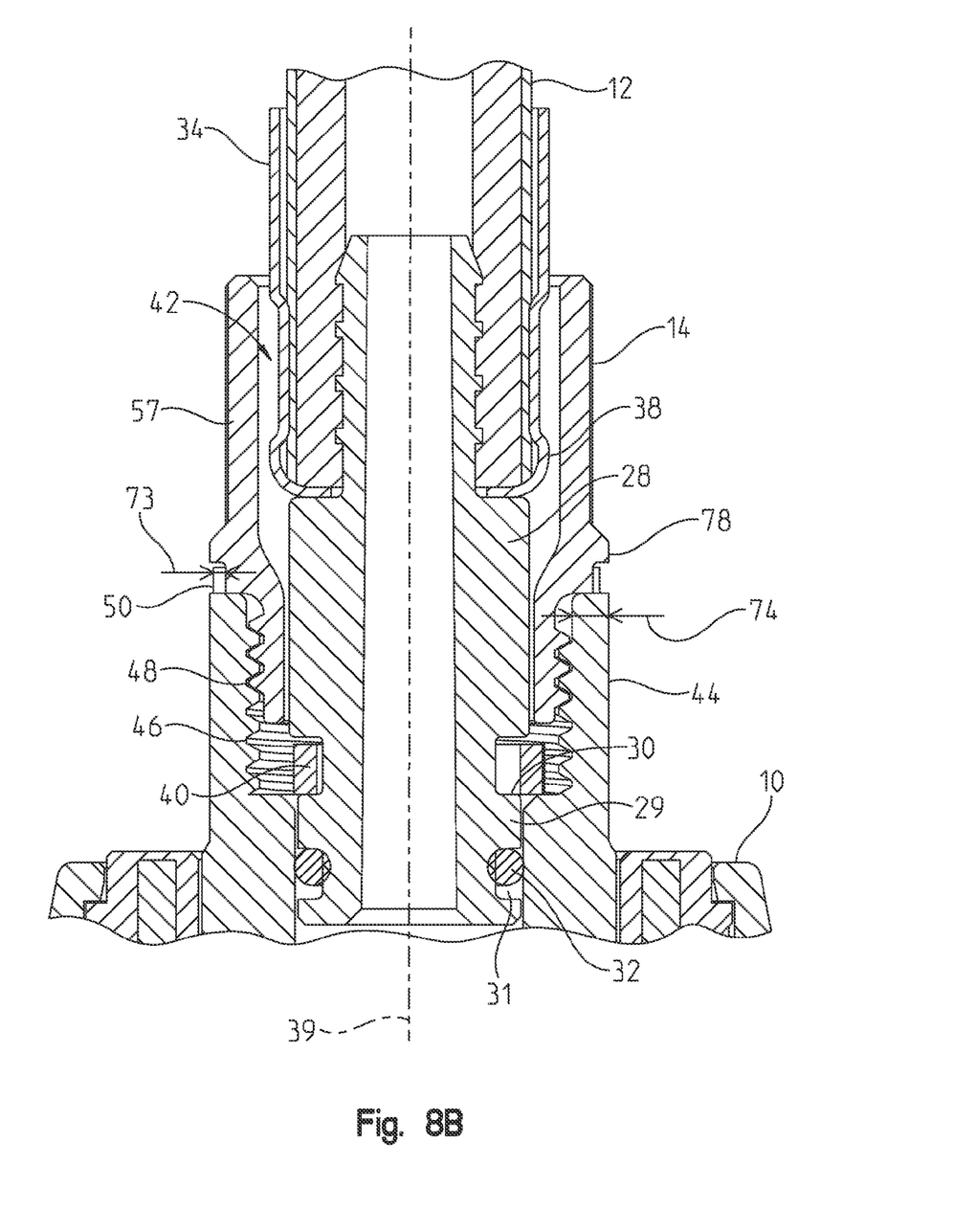
FIG. 8B is a cross-sectional view of another exemplary fluid coupling in which the sleeve is crimped to the fluid conduit and does not include flared end.

To secure fluid conduit 12 to ratcheting hose nut 14, C-shaped clip 40 is received within circumferential groove 30 of body 29, and delivery connector 28 is illustratively inserted through an interior passage 42 (see FIGS. 7-9) of ratcheting hose nut 14 from a first (upper) end to a second (lower) end. Interior passage 42 (see FIGS. 7-9) has a minimum inner diameter less than the outer diameter of clip 40 in the open position. The ends of C-shaped clip 40 are forced together to the closed position, allowing clip 40 to pass through interior passage 42 of nut 14. Due to the bias of clip 40 towards the open position, the arms of clip 40 return towards the open position once positioned outside the lower end of the nut 14. In one illustrative embodiment, as shown in FIG. 8A, ratcheting hose nut 14 is thus fixed between flared end 36 of sleeve 34 and C-shaped clip 40 attached to delivery connector 28. In another illustrative embodiment, as shown in FIG. 8B, sleeve 34 is crimped to fluid conduit 12 and does not include flared end 36. In this embodiment, the outer diameter of flared end 38 is larger than the inner diameter of a lower portion of ratcheting hose nut 14, thus fixing the lower portion of ratcheting hose nut 14 between flared end 38 and C-shaped clip 40 attached to delivery connector 38. In some illustrative embodiments, flared end 38 provides a bearing surface for ratcheting hose nut 14 to rotate about sleeve 34, allowing for a rotatable connection between fluid conduit 12 and ratcheting hose nut 14.

Illustratively, sprayhead 10 includes a waterway 43 including a connector 44 extending from inlet end 16. Connector 44 illustratively includes an internally threaded surface (i.e. internal or female threads) 46 configured to cooperate with an externally threaded surface (i.e. external or male threads) 48 on ratcheting hose nut 14 to couple sprayhead 10 to ratcheting hose nut 14. Connector 44 further includes a plurality of circumferentially spaced teeth 50 extending axially from connector 44. The plurality of teeth 50 define a series of circumferential gaps 51 between adjacent teeth 50.

Figure 3:
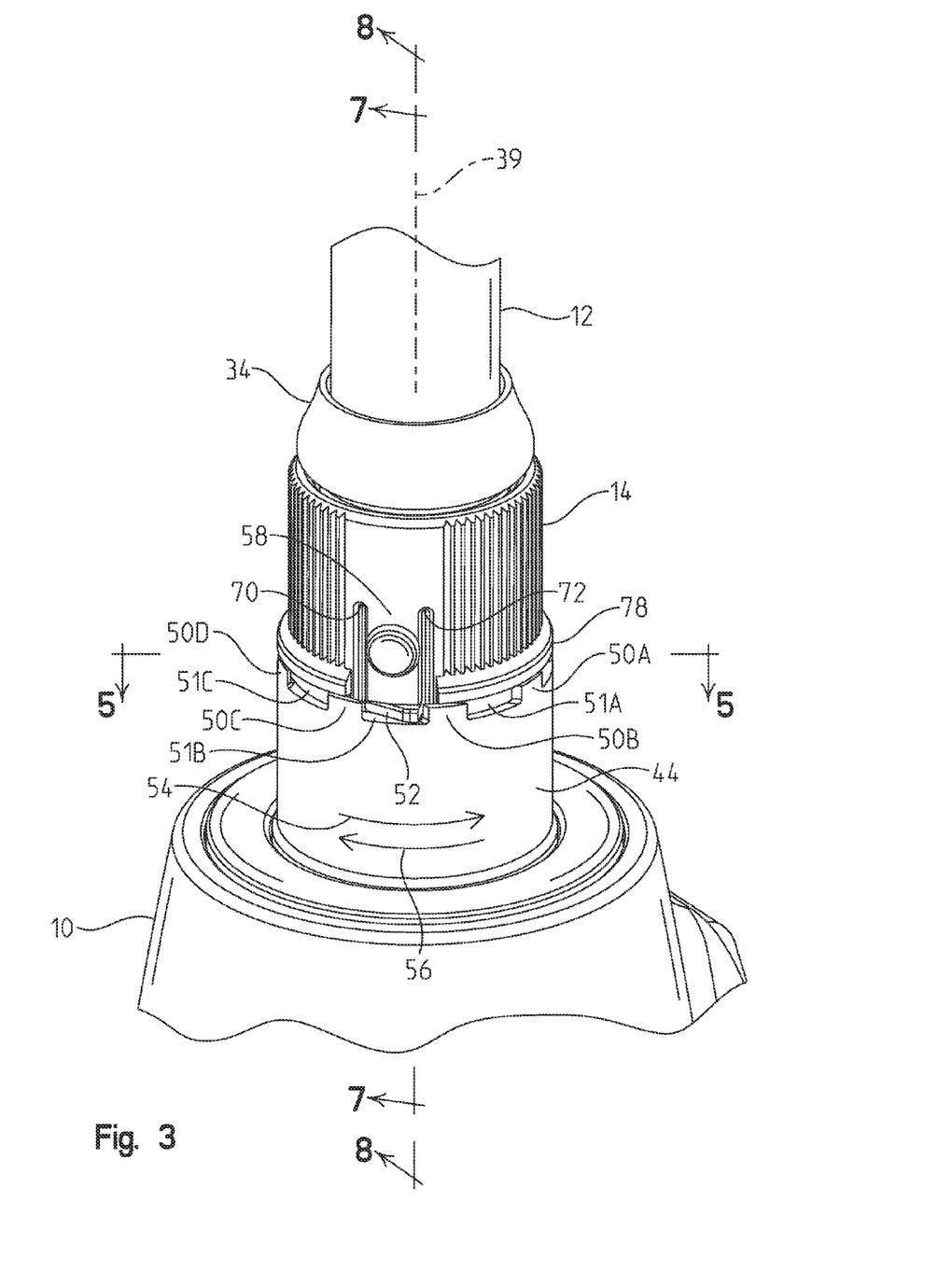
FIG. 3 is an enlarged partial view of FIG. 1, illustrating cooperation between the ratcheting hose nut and the sprayhead.
Figure 4:
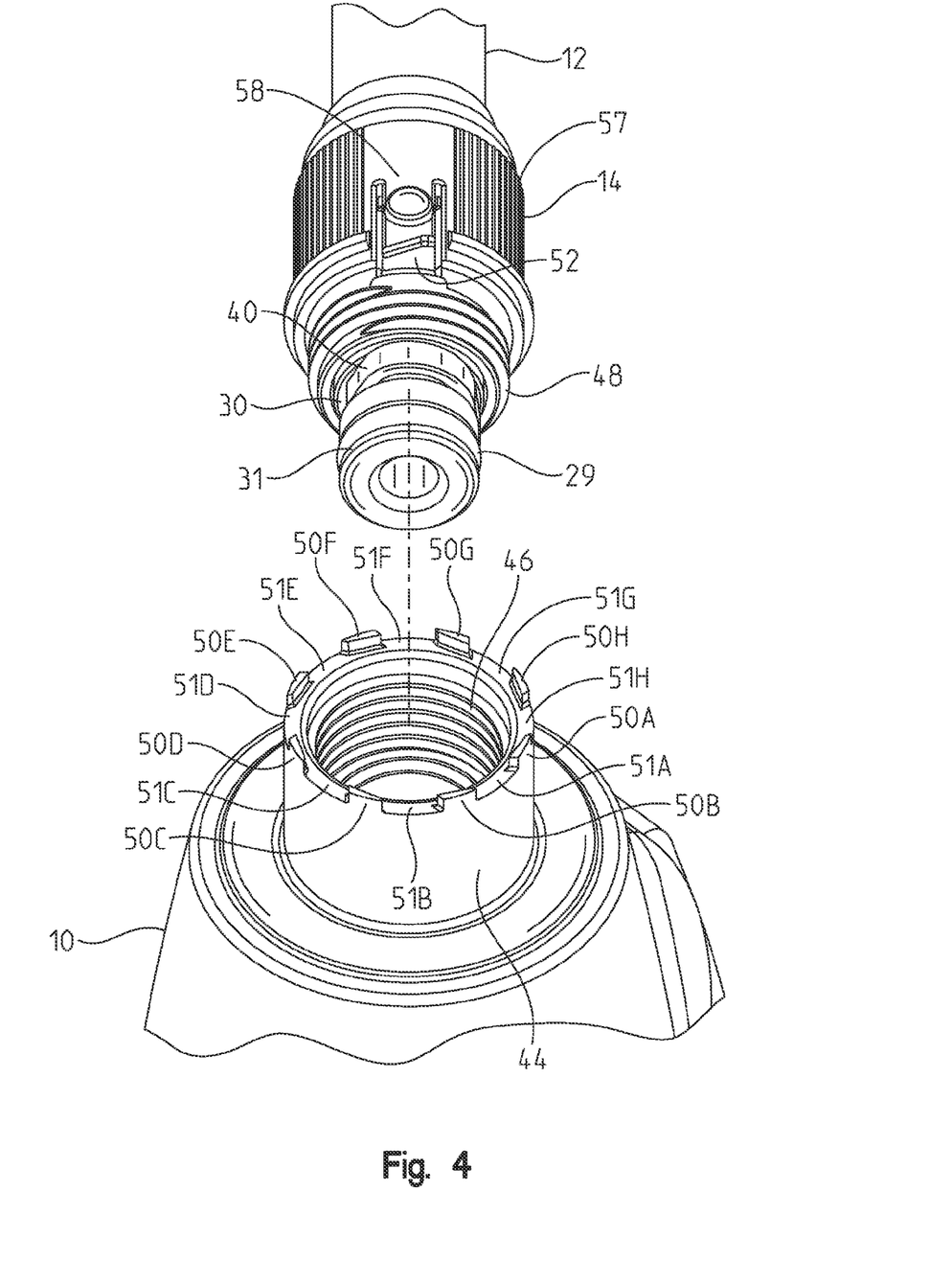
FIG. 4 is a perspective view of the uncoupled ratcheting hose nut and sprayhead illustrated in FIG. 3.
Figure 5:
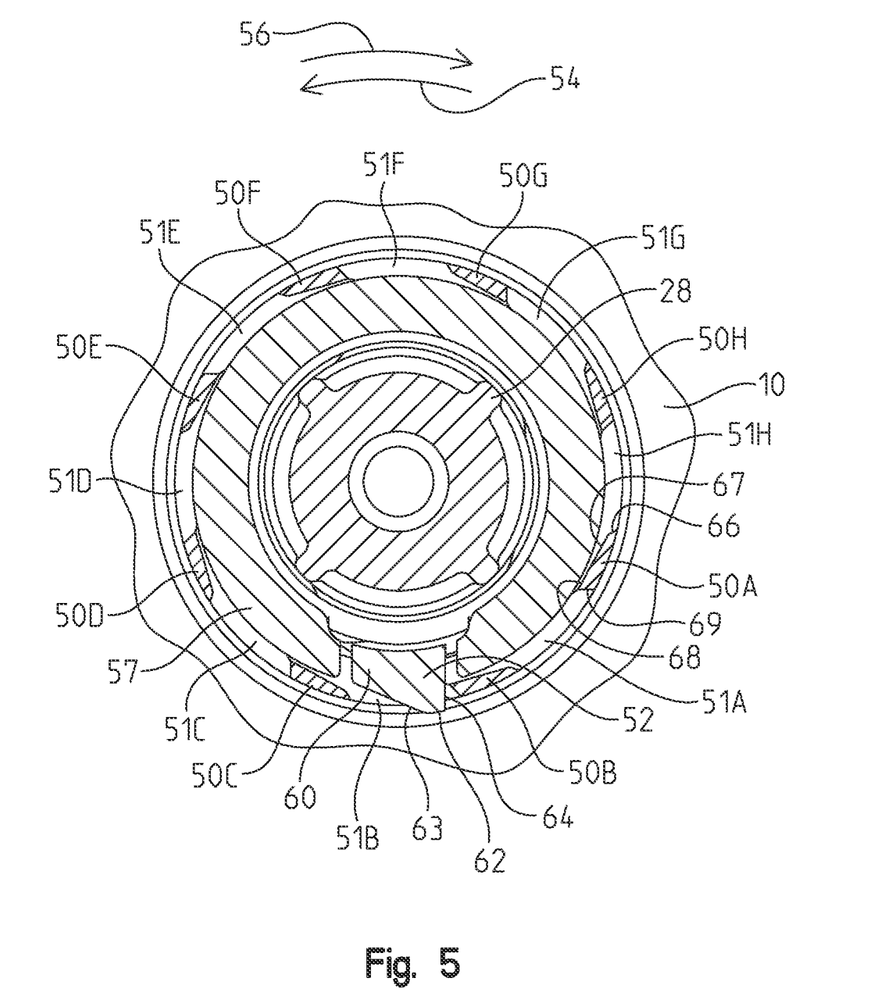
FIG. 5 is a cross-sectional view taken along line 5-5 of FIG. 3 of the ratcheting hose nut and spray head, with the ratcheting hose nut in a locked position.
Figure 6:
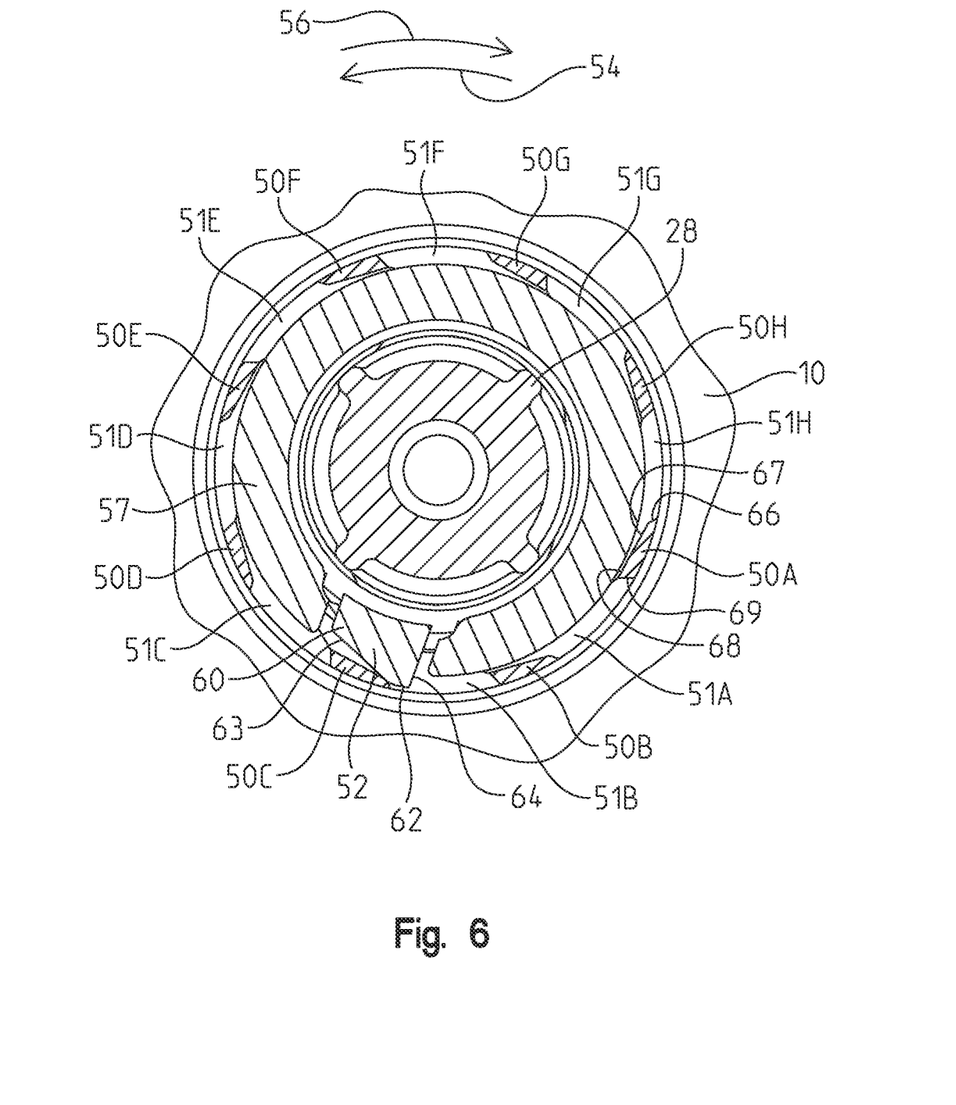
FIG. 6 is a cross-sectional view similar to FIG. 5, with the ratcheting hose nut in an unlocked position.

Referring next to FIGS. 3-6, the plurality of teeth 50, individually labeled as teeth 50A, 50B, 50C, 50D, 50E, 50F, 50G, and 50H, and circumferential gaps, individually labeled as gaps 51A, 51B, 51C, 51D, 51E, 51F, 51G, and 51H, cooperate with a pawl 52 of ratcheting hose nut 14 to allow rotation of sprayhead 10 relative to ratcheting hose nut 14 in a first tightening direction 54 but resist rotation in a second loosening direction 56 (see FIGS. 3, 5, and 6). In the illustrated embodiment, connector 44 of sprayhead 10 includes eight evenly spaced teeth 50 defining eight evenly spaced gaps 51 around a top circumference of connector 44. In other embodiments, more or fewer than eight teeth 50 defining more or fewer than eight gaps 51 are provided.

Illustratively, hose nut 14 includes a cylindrical side wall 57 supporting threads 48 and pawl 52. Referring to FIGS. 5 and 6, pawl 52 illustratively includes a front or leading end 60, a rear or trailing end 62, and an engagement or locking surface 64. Leading end 60 is thinner than trailing end 62. Pawl 52 further includes an inclined angle or ramped surface 63 extending from leading end 60 to trailing end 62. In the illustrated embodiment, ratcheting hose nut 14 includes one pawl 52, although in other embodiments, ratcheting hose nut 14 includes two or more ratchets (not shown).

Illustratively, teeth 50 extend axially along a longitudinal axis from connector 44 towards fluid conduit 12. In other embodiments, teeth 50 are positioned on an interior surface of connector 44 extend radially inward (not shown).

Teeth 50, as illustrated in FIG. 5 for tooth 50A, include a front or leading end 66, a rear or trailing end 68, and an engagement or locking surface 69. Leading end 66 is illustratively thinner than trailing end 68. Tooth 50A further includes an inclined angle or ramped surface 67 extending from leading end 66 to trailing end 68.

In the illustrative embodiment shown in FIG. 8, the thickness 73 of teeth 50 is less than the thickness 74 of the portion of connector 44 from which teeth 50 extend. In other embodiments, at least a portion of teeth 50 is of the same or greater thickness than the thickness 74 of the portion of connector 44 from which teeth 50 extend.

Pawl 52 is adjustable between a first locked position, illustrated in FIG. 5, and a second unlocked position, illustrated in FIG. 6 by pivoting about hinge 58. Illustratively, hinge 58 is constructed of a resilient material, such as plastic or other elastomeric material, and may be integrally formed with the sidewall 57. In the illustrated embodiment, ratcheting hose nut includes channels 70, 72 within sidewall 57 for defining hinge 58. Hinge 58 is biased outwardly, biasing pawl 52 radially outwardly in the locked position. Applying a pushing force to pawl 52 rotates pawl 52 inwardly about hinge 58 until it reaches the unlocked position. In still another embodiment, ratcheting hose nut 14 does not include any channels (not shown) and deforming pawl 52 inwardly rotates pawl 52 about hinge 58 and further deforms at least a portion of the remaining circumference of ratcheting hose nut 14. In yet still another embodiment, ratcheting hose nut 14 includes only a single channel 72 adjacent to the trailing end 62 of the pawl 52 (not shown).

Figure 9:
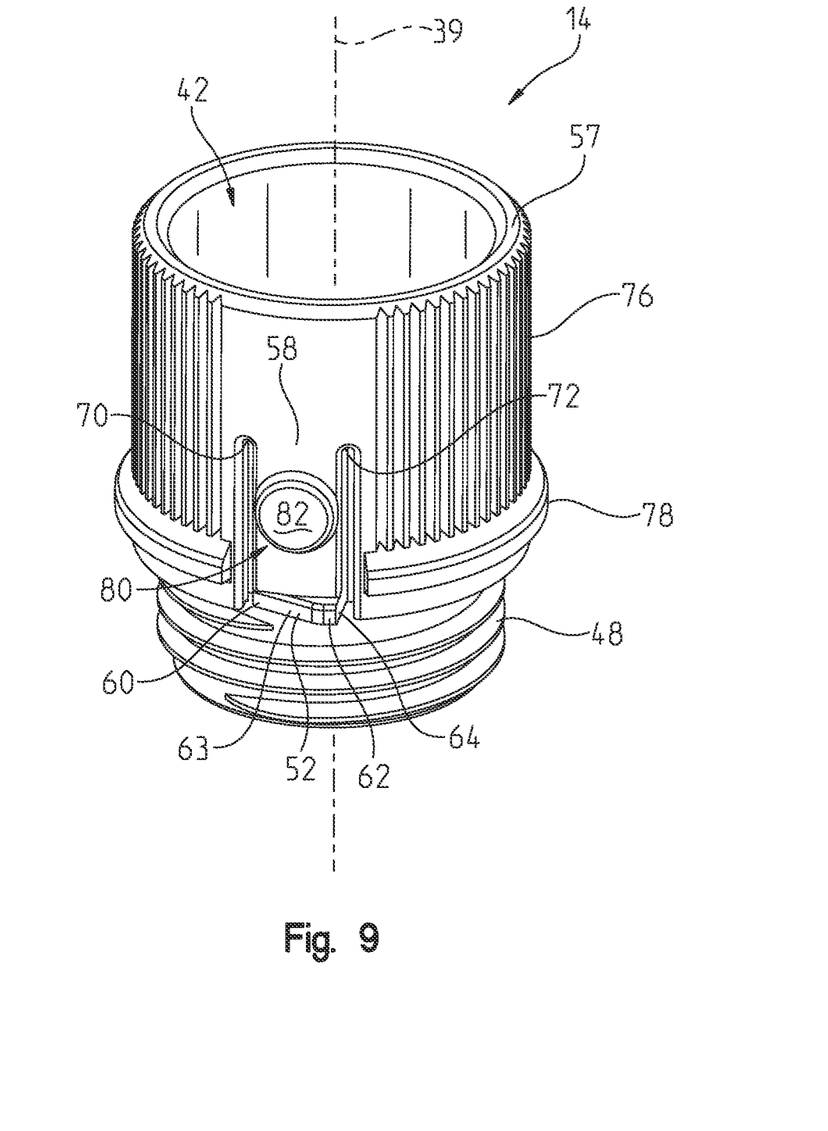
FIG. 9 is a perspective view of an illustrative ratcheting hose nut according to the present disclosure.

Referring next to FIG. 9, an illustrative embodiment of ratcheting hose nut 14 is shown. In an illustrative embodiment, an outer surface of sidewall 57 ratcheting hose nut 14 includes a plurality of ridges 76 to provide additional grip to a user. Illustratively, ratcheting hose nut 14 can be rotated around longitudinal axis 39 in first tightening direction until an annular stop flange 78 positioned around a circumference of ratcheting hose nut 14 above pawl 52 contacts one or more protrusions (e.g. teeth 50). Stop flange 78 is not able to deform to allow further rotation of ratcheting hose nut 14 in the first tightening direction.

Ratcheting hose nut 14 further includes a release 80 operably coupled to pawl 52. Applying a pressing force to release 80 causes pawl 52 to be pivoted about hinge 58 and moved radially inwardly from the locked position to the unlocked position. Due to the radially outward bias of hinge 58, pawl 52 is biased back to the locked position when the pressing force on release 80 is removed. As illustrated, release 80 includes button 82 or other tactile device indicating the position of release 80.

Referring again to FIGS. 3-8, interior threaded surface or internal threads 46 and exterior threaded surface or external threads 48 engage as sprayhead 10 is threaded on to ratcheting hose nut 14 in first tightening direction 54 (counterclockwise as shown in FIGS. 3, 5 and 6). Pawl 52 is originally spaced apart along longitudinal axis 39 from teeth 50. As sprayhead 10 is further threaded on to ratcheting hose nut 14 in first tightening direction 54, internally threaded surface 46 and exterior threaded surface 48 cooperate to draw connector 44 of pulldown assembly closer to pawl 52 of ratcheting hose nut 14. At some point in rotation in first tightening direction 54, at least one tooth 50 will come in contact with pawl 52.

In the illustrative embodiment of FIGS. 5 and 6, first tooth 50A radially engages pawl 52 to allow sprayhead 10 to continue rotating in first tightening direction 54. Leading end 60 of pawl 52 is originally positioned interior of leading end 66 of tooth 50A. As at least one of leading end 60 and ramped surface 63 of pawl 52 engage at least one of leading end 66 and ramped surface 67 of tooth 50A, pawl 52 is pivoted radially inwardly about hinge 58 towards the unlocked position. The resilient construction of hinge 58 allows for this deformation. As ratcheting hose nut 14 is further rotated in first tightening direction 54, ramped surfaces 63 and 67 radially engage to apply a pressing force to pawl 52 pivoting pawl 52 radially inwardly to the unlocked position, and allowing further rotation in the first tightening direction 54.

Once trailing end 62 of pawl 52 is rotated in the first tightening direction 54 past trailing end 68 of first tooth 50A, first tooth 50A no longer exerts a pressing force on pawl 52, and the outward bias of hinge 58 moves pawl 52 radially outwardly back to the locked position in the circumferential gap 51A between first tooth 50A and the next adjacent tooth 50B. Further rotation in first tightening direction 54 will result in at least one of leading end 60 and ramped surface 63 of pawl 52 engage at least one of leading end 66 and ramped surface 67 of tooth 50B, displacing pawl 52 radially inwardly to the unlocked position until trailing end 62 is rotated past trailing end 68 of second tooth 50B, where the outward bias of hinge 58 moves pawl back to the locked position in the circumferential gap 51B between second tooth 50B and the next adjacent tooth 50C. This ratcheting process will continue as the sidewall 57 of hose nut 14 is further rotated in the first tightening direction 54 until annular stop flange 78 axially contacts an upper surface of the teeth 50.

As illustrated in FIG. 5, rotation in a second loosening direction 56 (clockwise as shown in FIGS. 3, 5 and 6), opposite first tightening direction 54, is resisted by the cooperation of locking surface 64 with locking surface 69. When pawl 52 is in the locked position, locking surface 64 extends radially external to trailing end 68 of tooth 50B. More particularly, locking surface 64 of pawl 52 is configured to circumferentially engage with locking surface 69 of tooth 50B.

Illustratively, locking surface 64 of pawl 52 engages locking surface 69 of tooth 50B with a flat surface, and locking surface 69 of tooth 50B engages locking surface 64 of pawl 52 with an angled surface such that only the portion of locking surface 69 near trailing end 68 engages with locking surface 64. In other embodiments, both locking surfaces 64, 69 are flat surface, or both locking surface 64, 69 are angled, or locking surface 69 is flat and locking surface 64 is flat.

With further reference to FIGS. 5 and 6, to allow rotation in the second loosening direction 56, pawl 52 must be radially moved inwardly to the unlocked position to disengage locking surface 64 of pawl 52 from locking surface 69 of tooth 50B and allow trailing end 62 of pawl 52 to pass behind tooth 50B. By applying a pressing force to release 80, pawl 52 is pivoted radially inwardly about hinge 58 to the unlocked position. Illustratively, to allow ratcheting hose nut 14 to rotate in the second loosening direction 56, such as needed to unscrew sprayhead 10 from ratcheting hose nut 14 and fluid conduit 12, a user applies a pressing force to release 80 to depress pawl 52 such that the trailing end 62 and locking surface 64 are positioned radially interior to trailing end 68 and locking surface 69 of each tooth 50.

In one illustrative embodiment, a force is applied to release 80 to inwardly move pawl 52 for each tooth 50 that pawl 52 needs to pass. In another illustrative embodiment, a single force is applied to release 80, and pawl 52 and a user rotates pawl 52 past multiple teeth 50 before the force is released.

Although the invention has been described in detail with reference to certain preferred embodiments, variations and modifications exist within the spirit and scope of the invention as described and defined in the following claims.

The invention claimed is:

1. A fluid coupling for a fluid delivery device, the fluid coupling comprising:
a hose nut including:
a sidewall extending along a longitudinal axis and supporting threads;
a pawl coupled to the sidewall by a hinge, the hinge integrally formed with the sidewall, and the pawl configured to pivot about the hinge between a locked position and an unlocked position;
the hinge biasing the pawl radially outwardly from the unlocked position to the locked position;
the sidewall being rotatable about the longitudinal axis in a first tightening direction relative to the fluid delivery device and rotatable about the longitudinal axis in a second loosening direction relative to the fluid delivery device opposite the first tightening direction when the pawl is in the unlocked position;
the sidewall being rotatable about the longitudinal axis in the first tightening direction relative to the fluid delivery device and restrained from rotating about the longitudinal axis in the second loosening direction relative to the fluid delivery device when the pawl is in the locked position; and
a release supported by the pawl and configured to pivot the pawl about the hinge between the unlocked position and the locked position.

2. The fluid coupling of claim 1, wherein the pawl engages the fluid delivery device to radially move the pawl to the unlocked position during rotation in the first tightening direction, and the pawl engages the fluid delivery device to resist rotating in the second loosening direction when the pawl is in the locked position.

3. The fluid coupling of claim 1, further comprising a waterway including a connector wherein the pawl is configured to engage one of a plurality of teeth extending from the connector.

4. The fluid coupling of claim 3, wherein the teeth longitudinally extend from a top surface of the connector.

5. The fluid coupling of claim 1 further comprising an external threaded surface of the hose nut configured to cooperate with an internal threaded surface of the fluid delivery device.

6. The fluid coupling of claim 1 further comprising a clip connecting the hose nut to a fluid conduit.

7. The fluid coupling of claim 1, further comprising a first channel and a second channel, wherein the hinge is defined between the first and second channels and the release is positioned between the first and second channels.

8. The fluid coupling of claim 7, wherein the release further comprises a raised button.

9. The fluid coupling of claim 1, wherein the pawl comprises a leading end and a trailing end, the leading end being thinner than the trailing end, the leading end being configured to radially engage an interior surface of the fluid delivery device during rotation in the first tightening direction and the trailing end being configured to engage an interior surface of the fluid delivery device to resist rotation during rotation in the second loosening direction.

10. A fluid coupling for a fluid delivery device, the fluid coupling comprising:
a waterway including a connector having a plurality of teeth around a circumference of the connector defining a plurality of circumferential gaps between the plurality of teeth; and
a hose nut coupled to a fluid conduit, the hose nut including a pawl configured to rotate about a hinge between a locked position and an unlocked position, the pawl being radially received within one of the circumferential gaps between the plurality of teeth of the connector in the locked position;
the hinge biasing the pawl radially outwardly from the unlocked position to the locked position;
wherein the hose nut is configured to rotate in a first tightening direction relative to the waterway and a second loosening direction opposite the first tightening direction when the pawl is in the unlocked position;
wherein when the hose nut is in the locked position, the pawl is configured to radially engage at least one of the plurality of teeth during rotation in the first tightening direction, the radial engagement pivoting the pawl about the hinge towards the unlocked position, and the pawl is configured to circumferentially engage at least one of the plurality of teeth during rotation in the second loosening direction, the circumferential engagement resisting rotation in the second loosening direction; and
a release configured to rotate the pawl about the hinge between the locked position and the unlocked position.

11. The fluid coupling of claim 10, wherein the plurality of teeth longitudinally extend from a top surface of the fluid delivery device.

12. The fluid coupling of claim 10, wherein the hose nut further comprises an external threaded surface and the waterway further comprises an internal threaded surface, the internal threaded surface and external surface cooperating to couple the hose nut and waterway.

13. The fluid coupling of claim 10, wherein the hose nut is coupled to the fluid conduit with a substantially C-shaped clip.

14. The fluid coupling of claim 10, wherein the hose nut further comprises a first channel and a second channel, the hinge being defined between the first and second channels and the release including a raised button positioned between the first and second channels.

* * * * *